Figure 16:
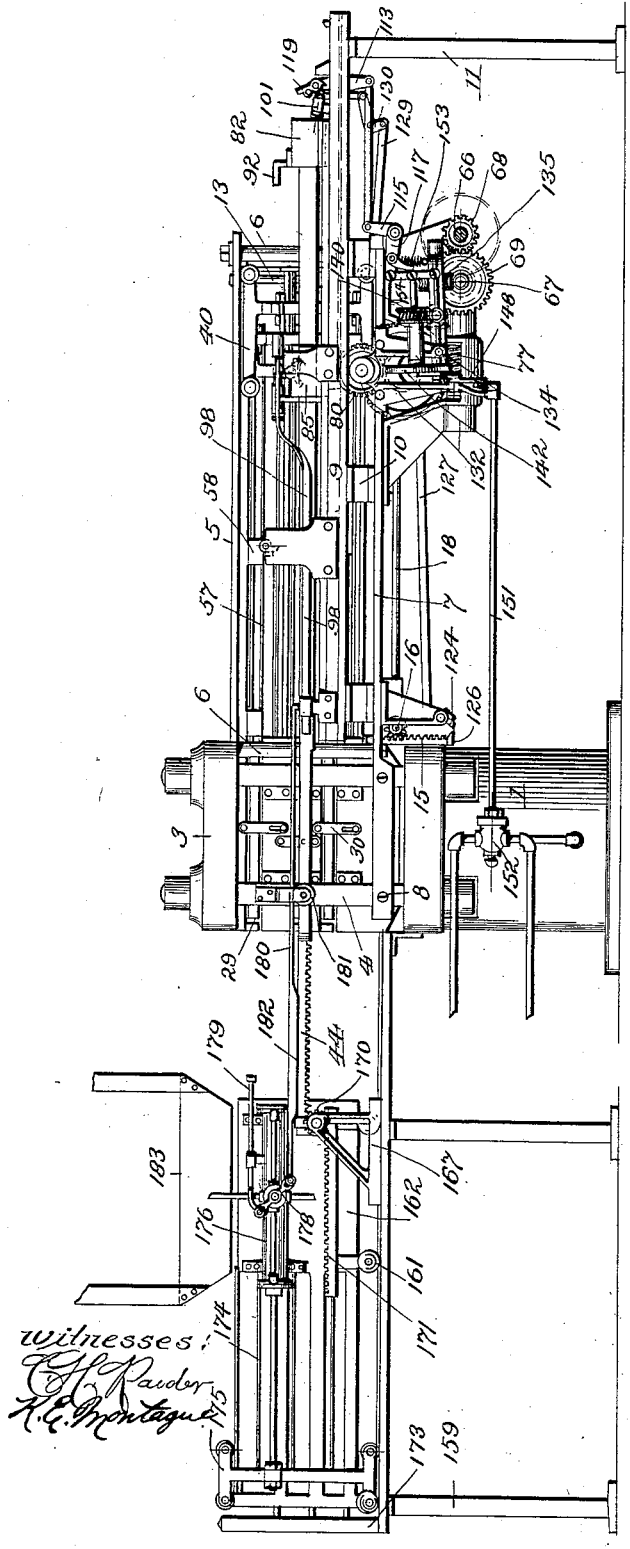

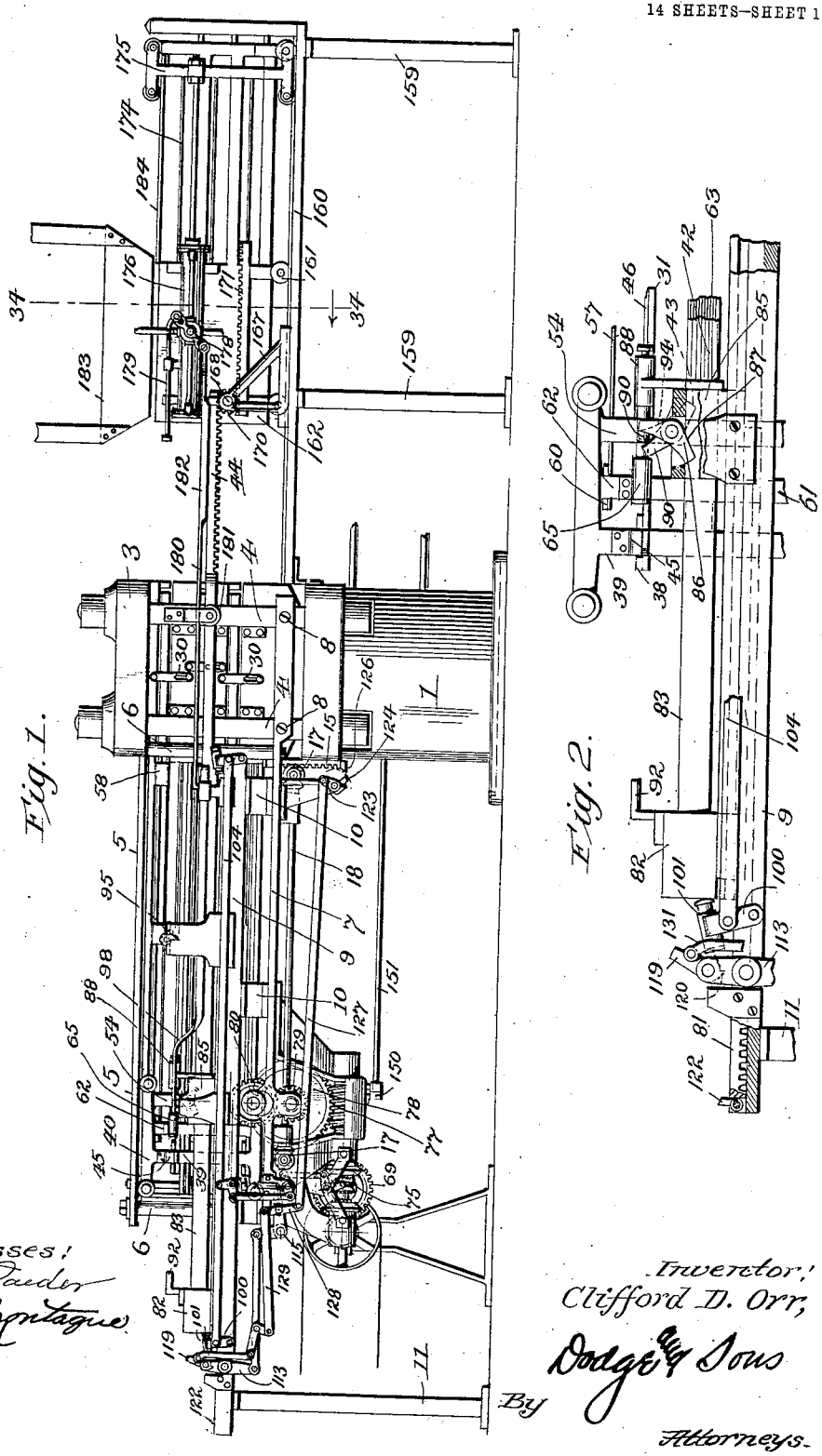

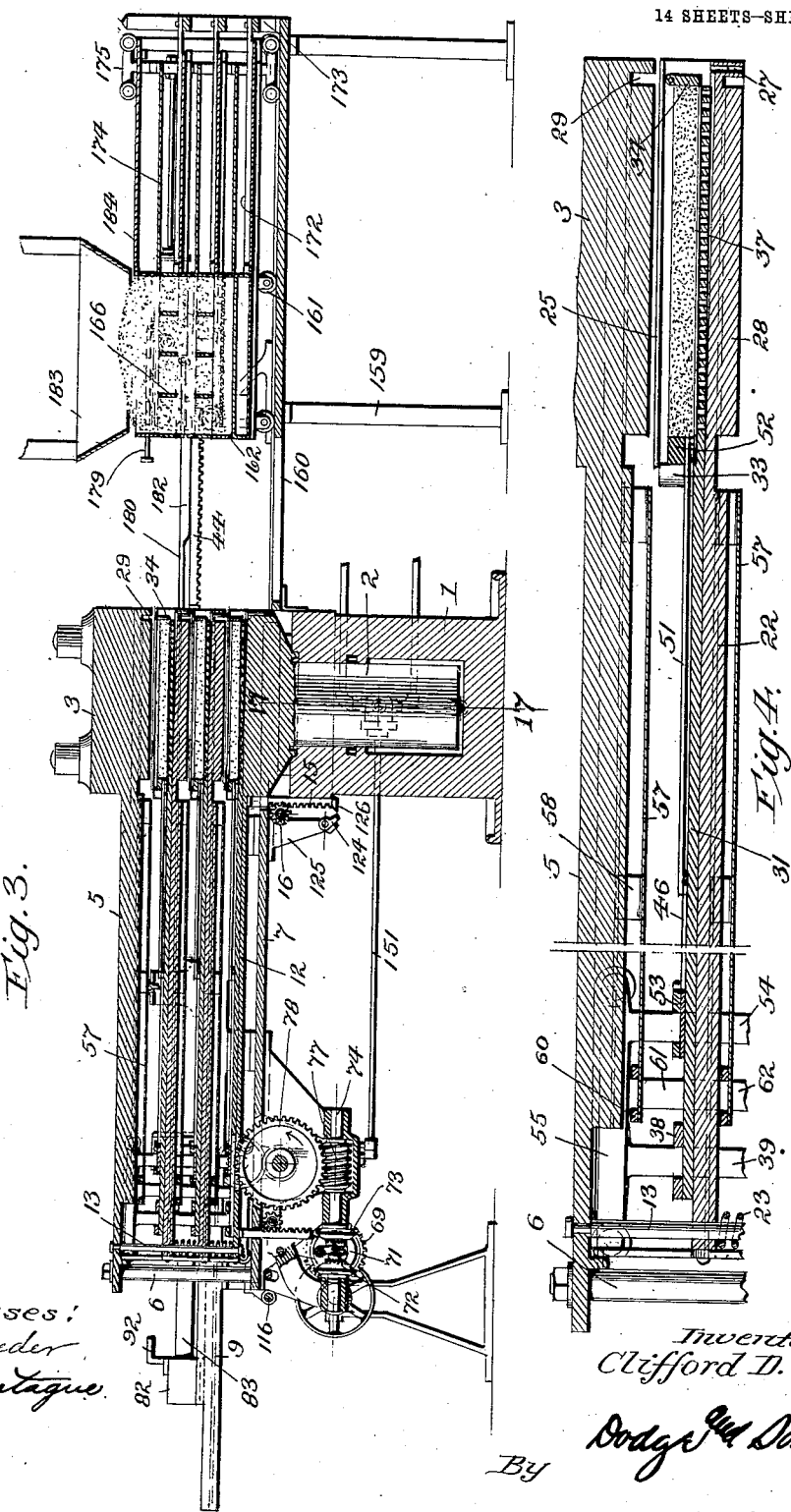

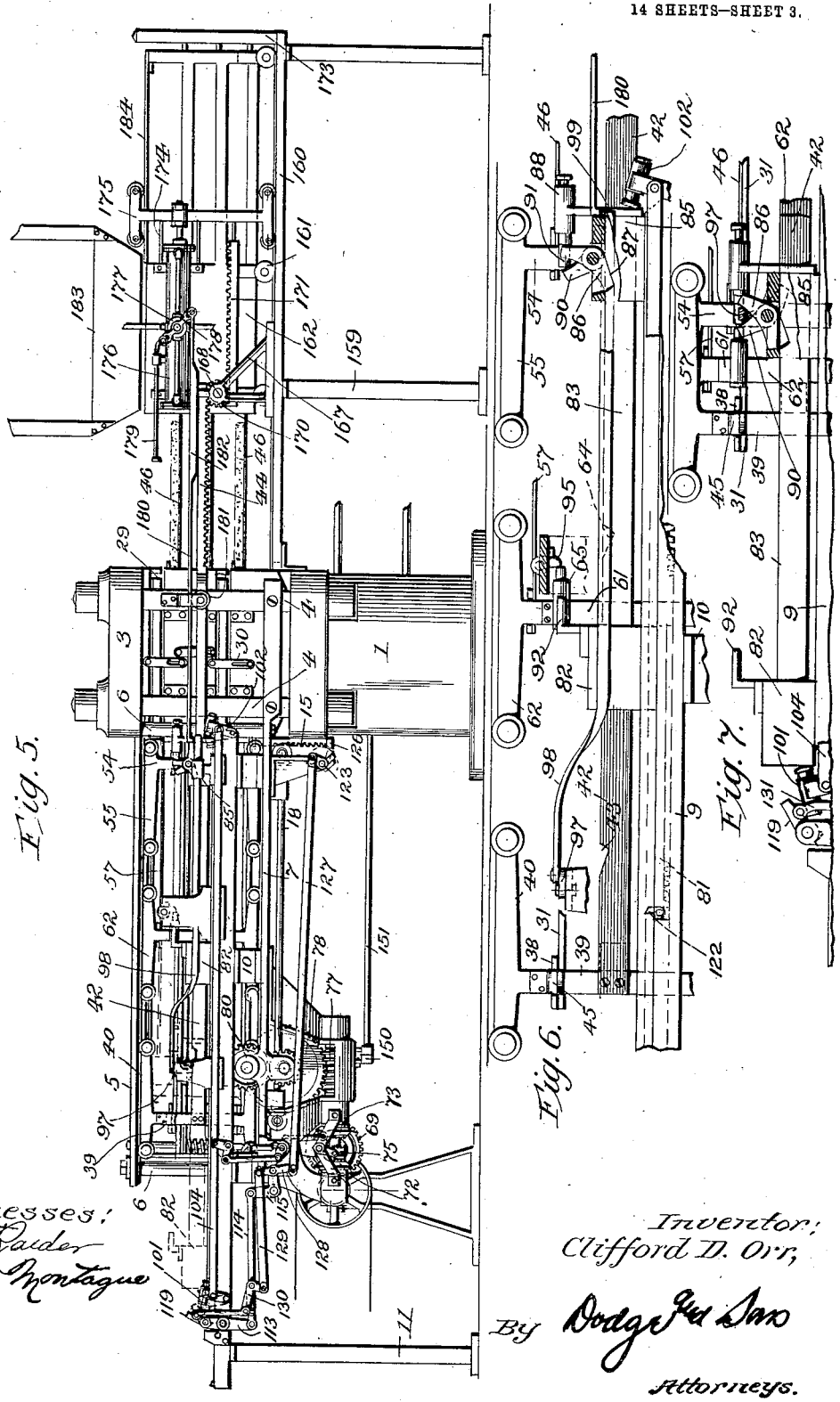

C. D. ORR.
OIL PRESS.
APPLICATION FILED FEB. 10, 1913.
1,085,993.
Patented Feb. 3, 1914.
14 SHEETS—SHEET 4.
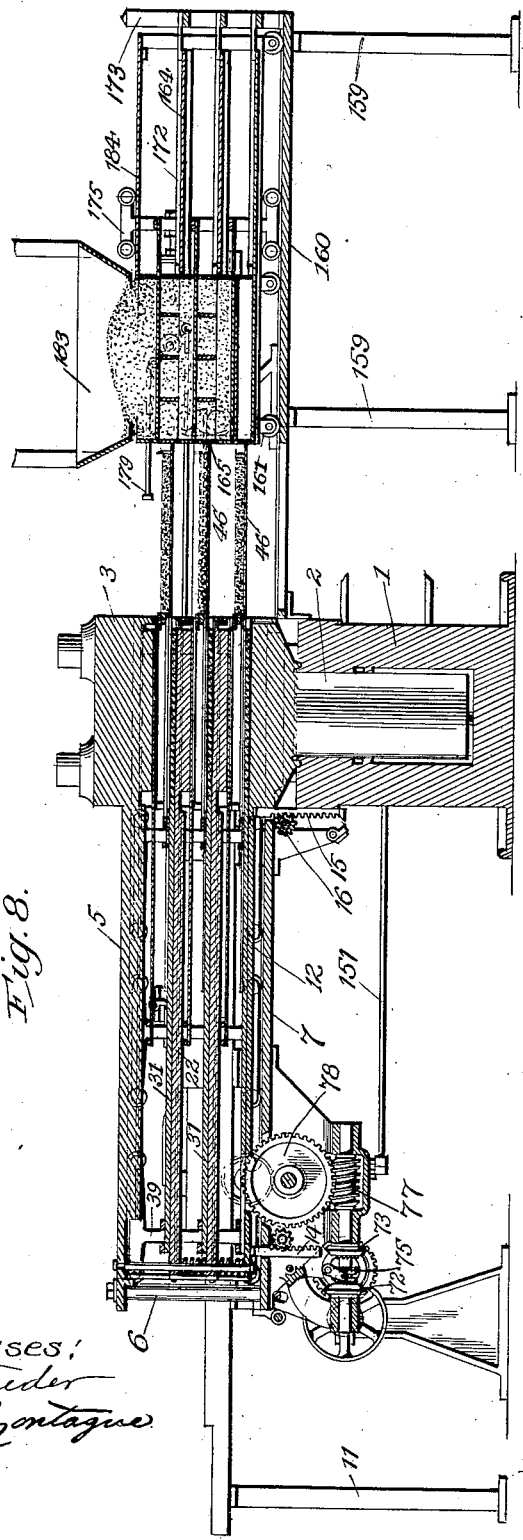
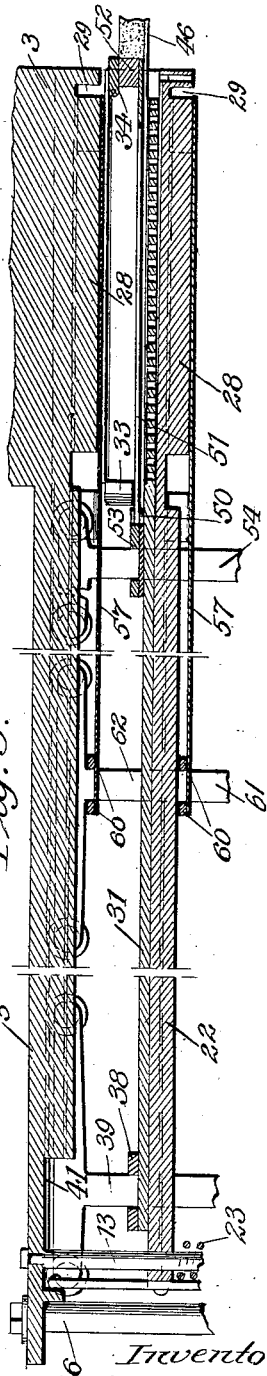
Witnesses:
Inventor:
Clifford D. Orr,
Attorneys.

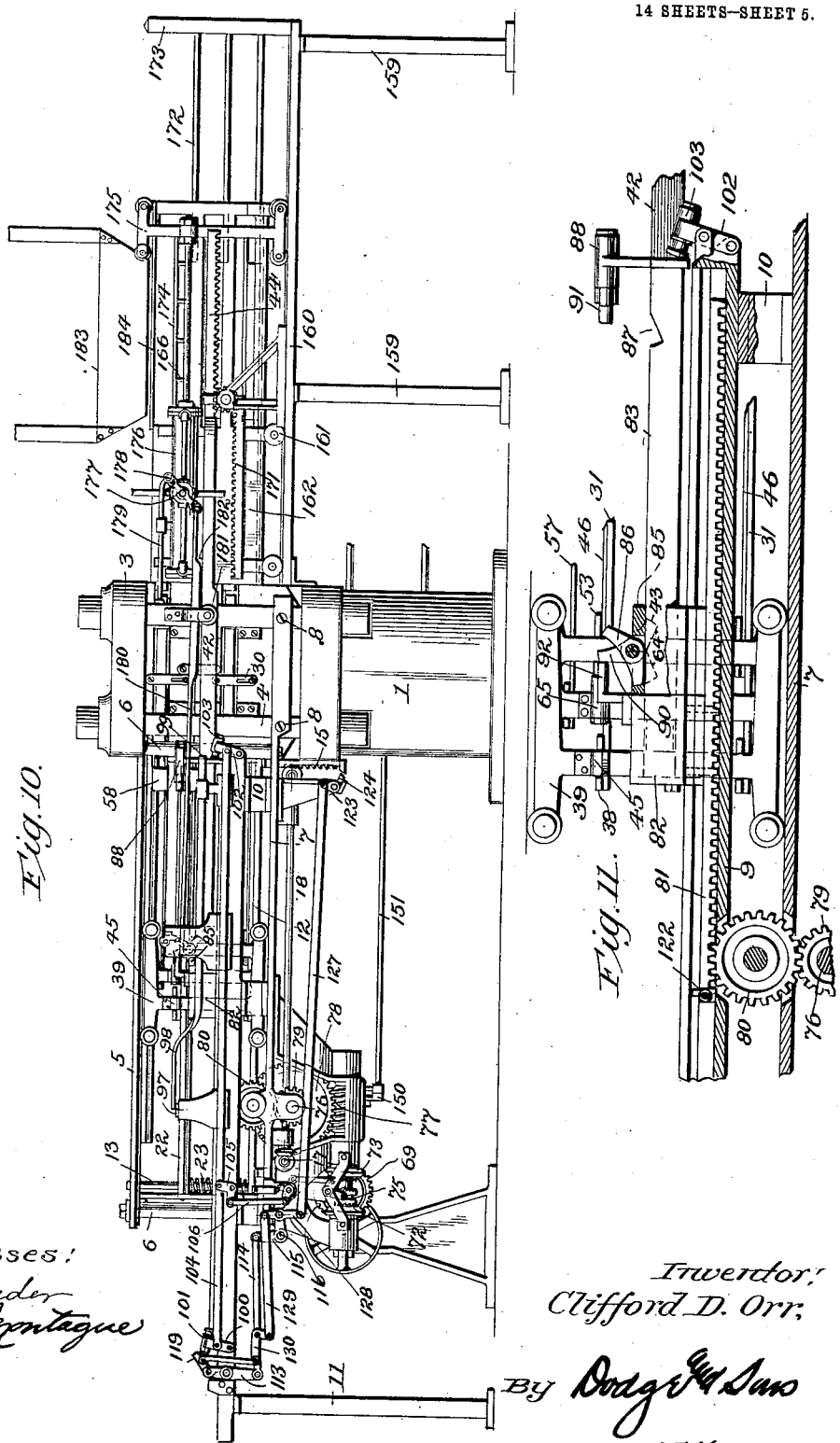

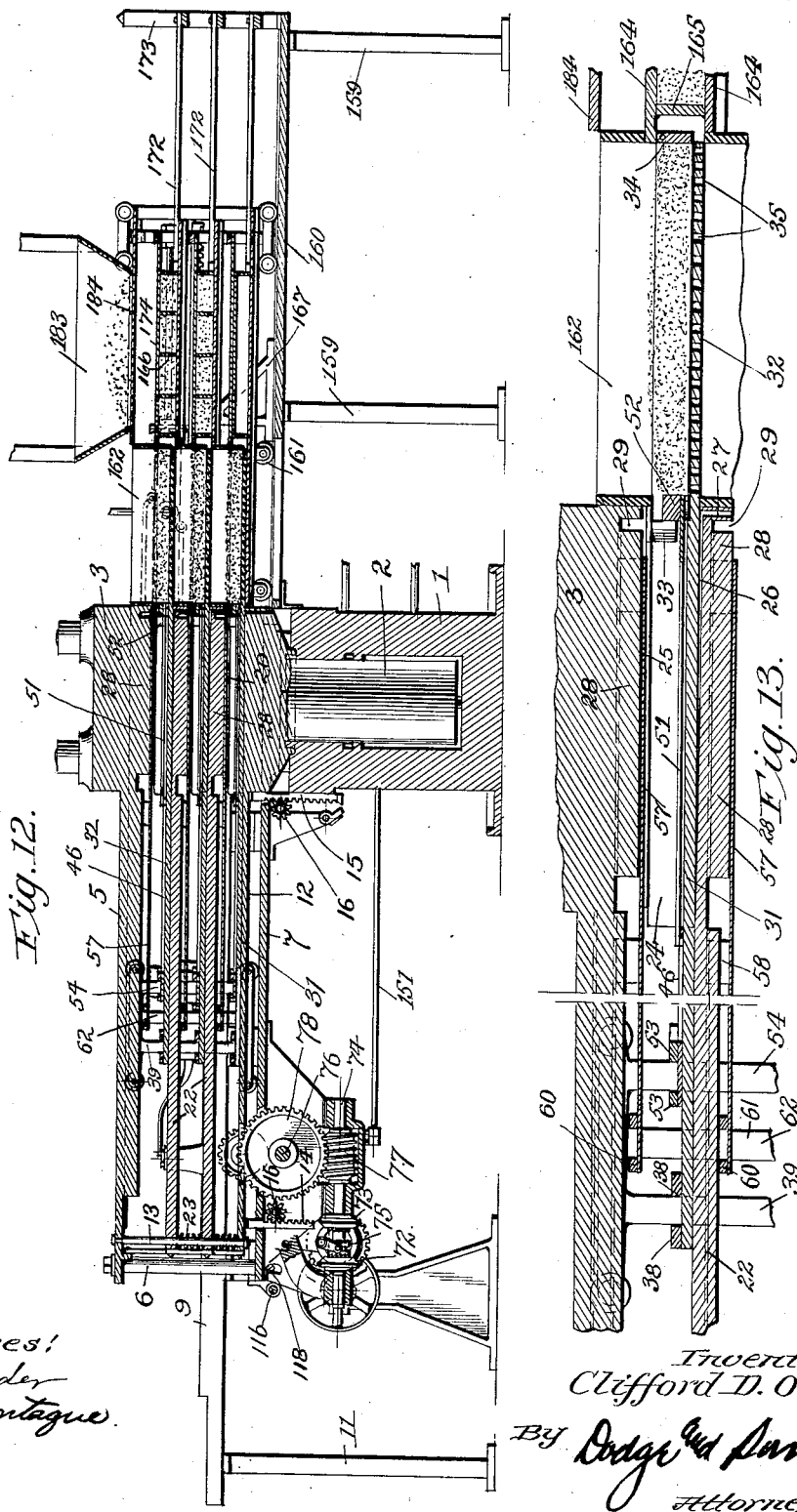

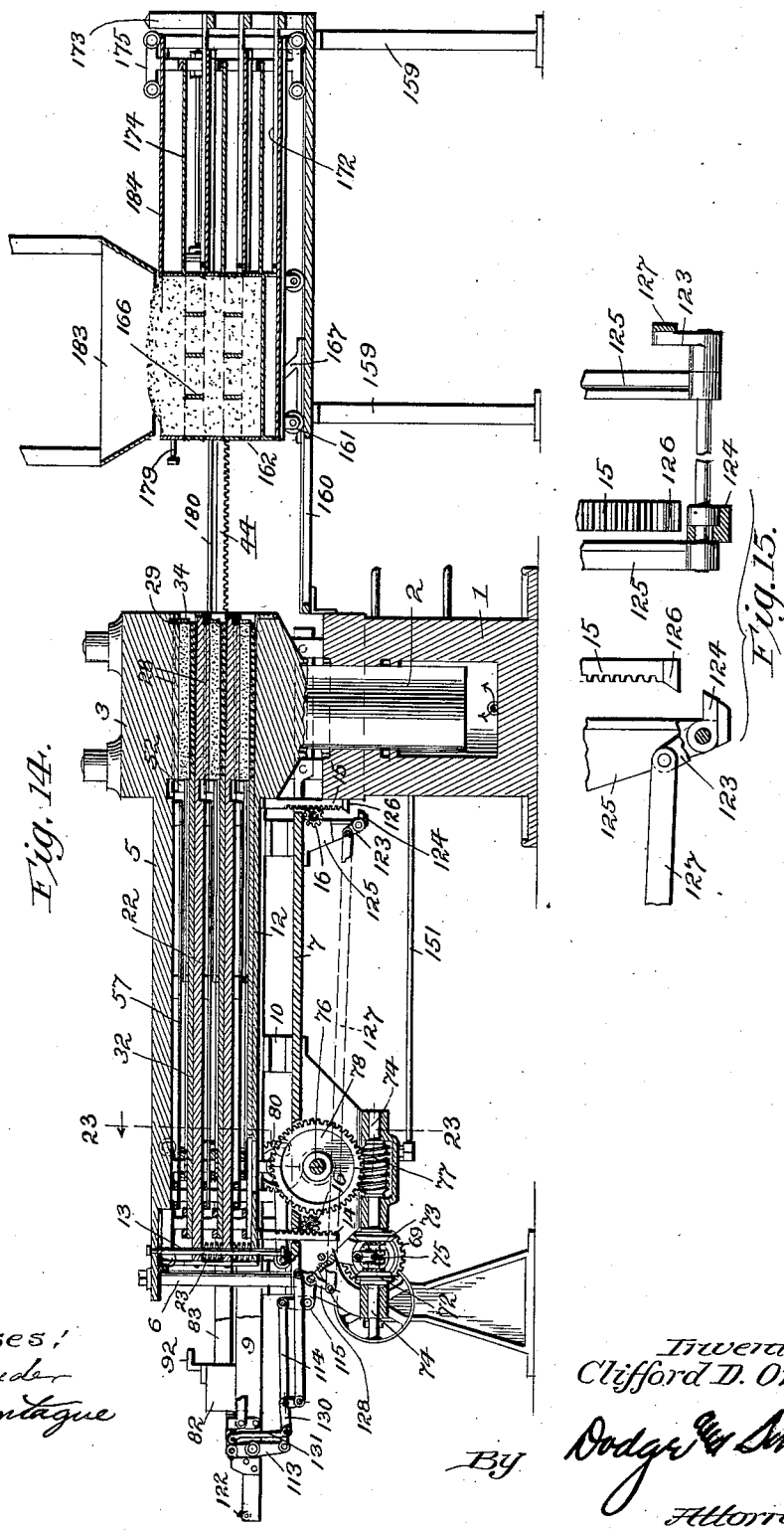

C. D. ORR.
OIL PRESS.
APPLICATION FILED FEB. 10, 1913.

1,085,993.

Patented Feb. 3, 1914.
14 SHEETS—SHEET 8.

Witnesses:

Inventor
Clifford D. Orr,
By Dodge & Sons
Attorneys.

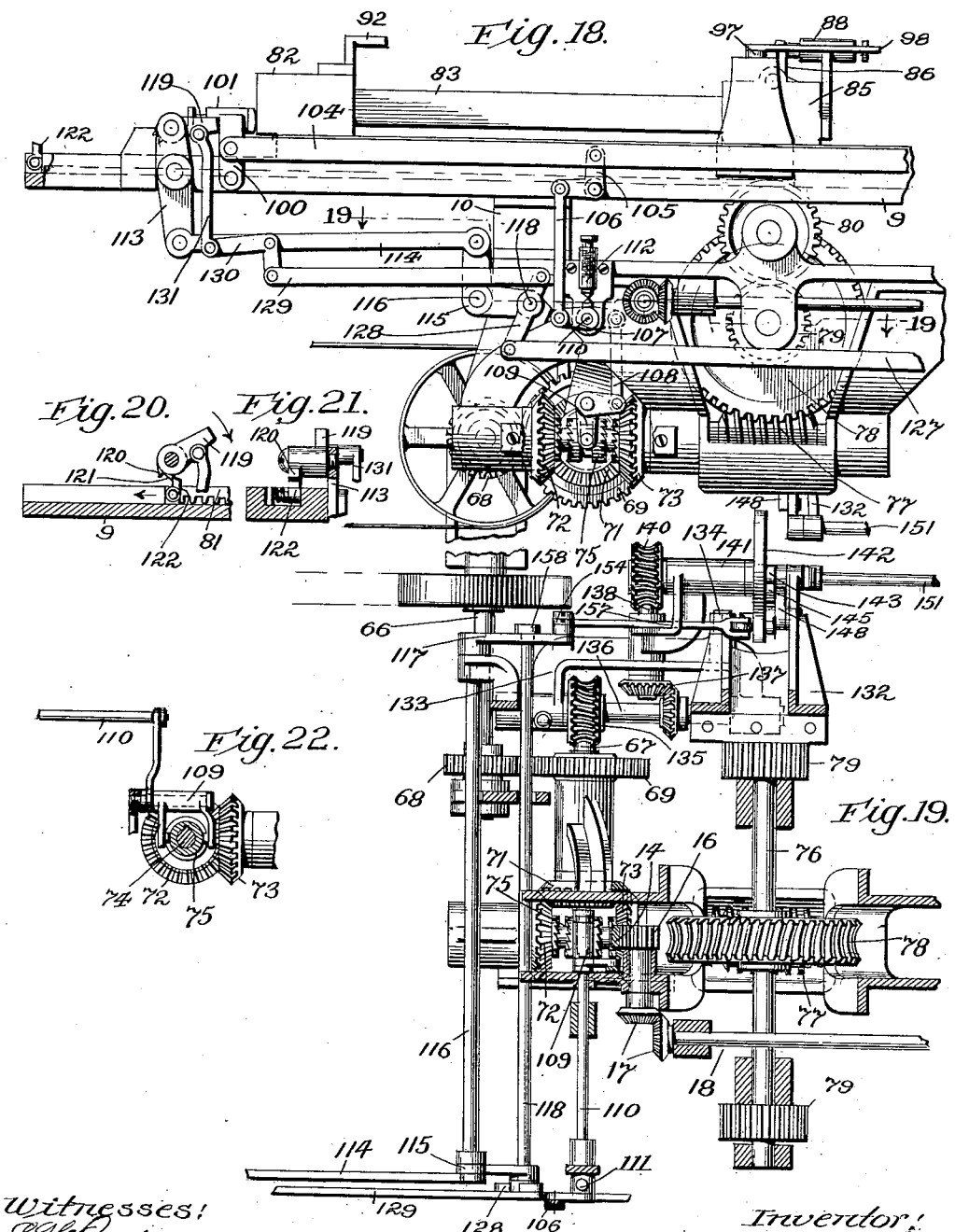

C. D. ORR.
OIL PRESS.
APPLICATION FILED FEB. 10, 1913.

1,085,993.

Patented Feb. 3, 1914.
14 SHEETS—SHEET 10.

Witnesses:
C. H. Rauder
K. E. Montague

Inventor:
Clifford D. Orr,
By Dodge and Sons
Attorneys.

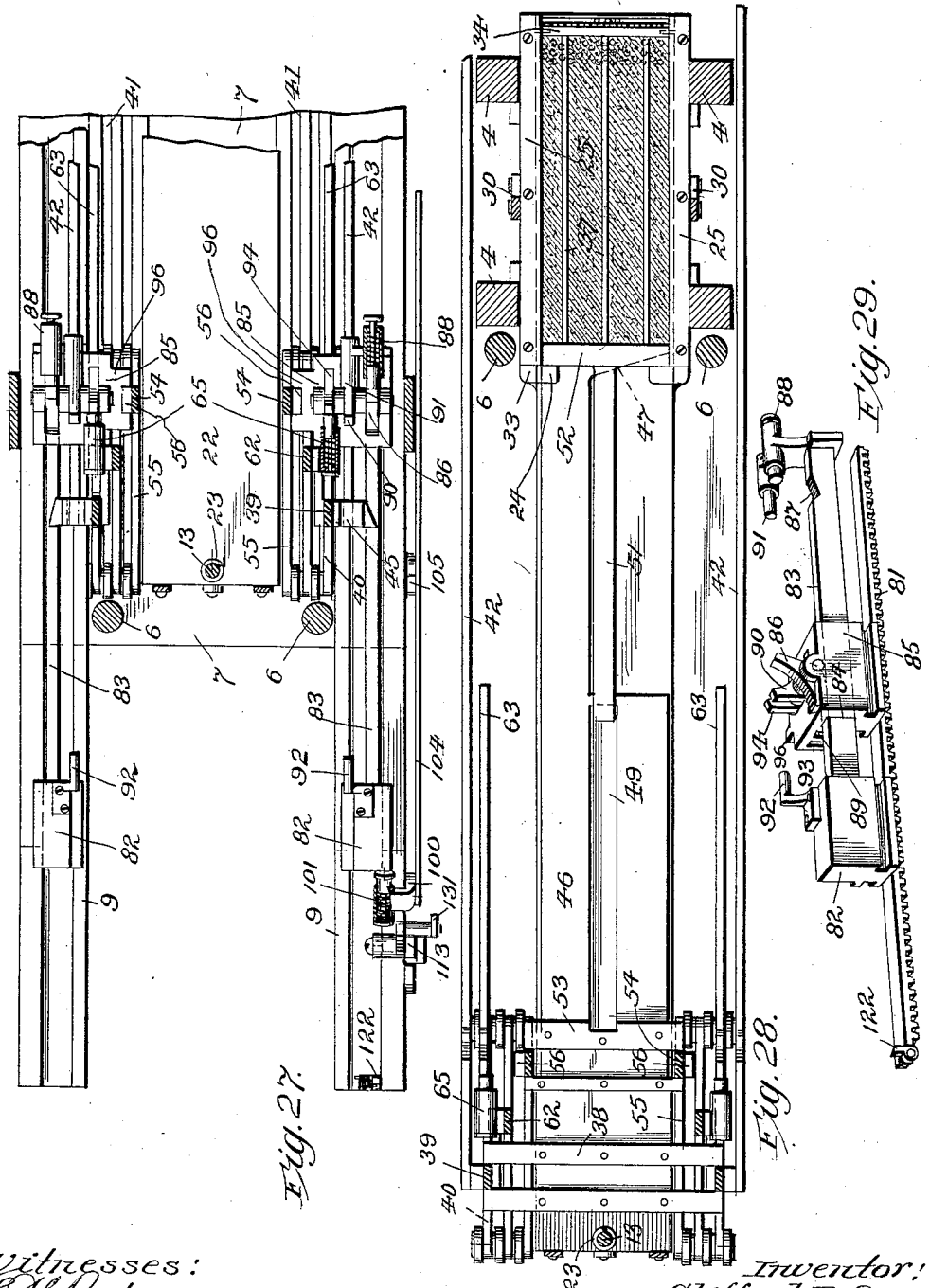

C. D. ORR.
OIL PRESS.
APPLICATION FILED FEB. 10, 1913.
1,085,993.
Patented Feb. 3, 1914.
14 SHEETS—SHEET 12.
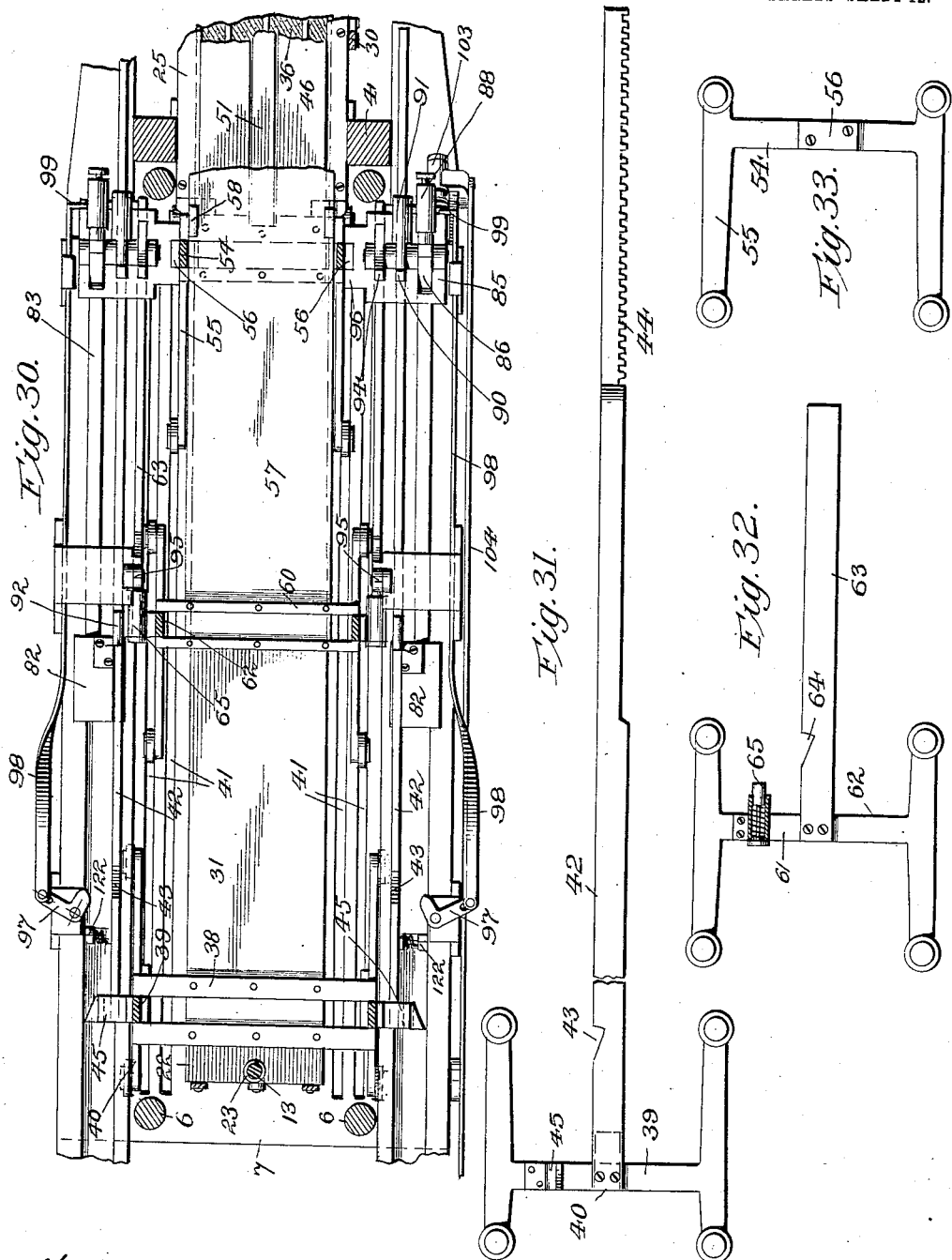

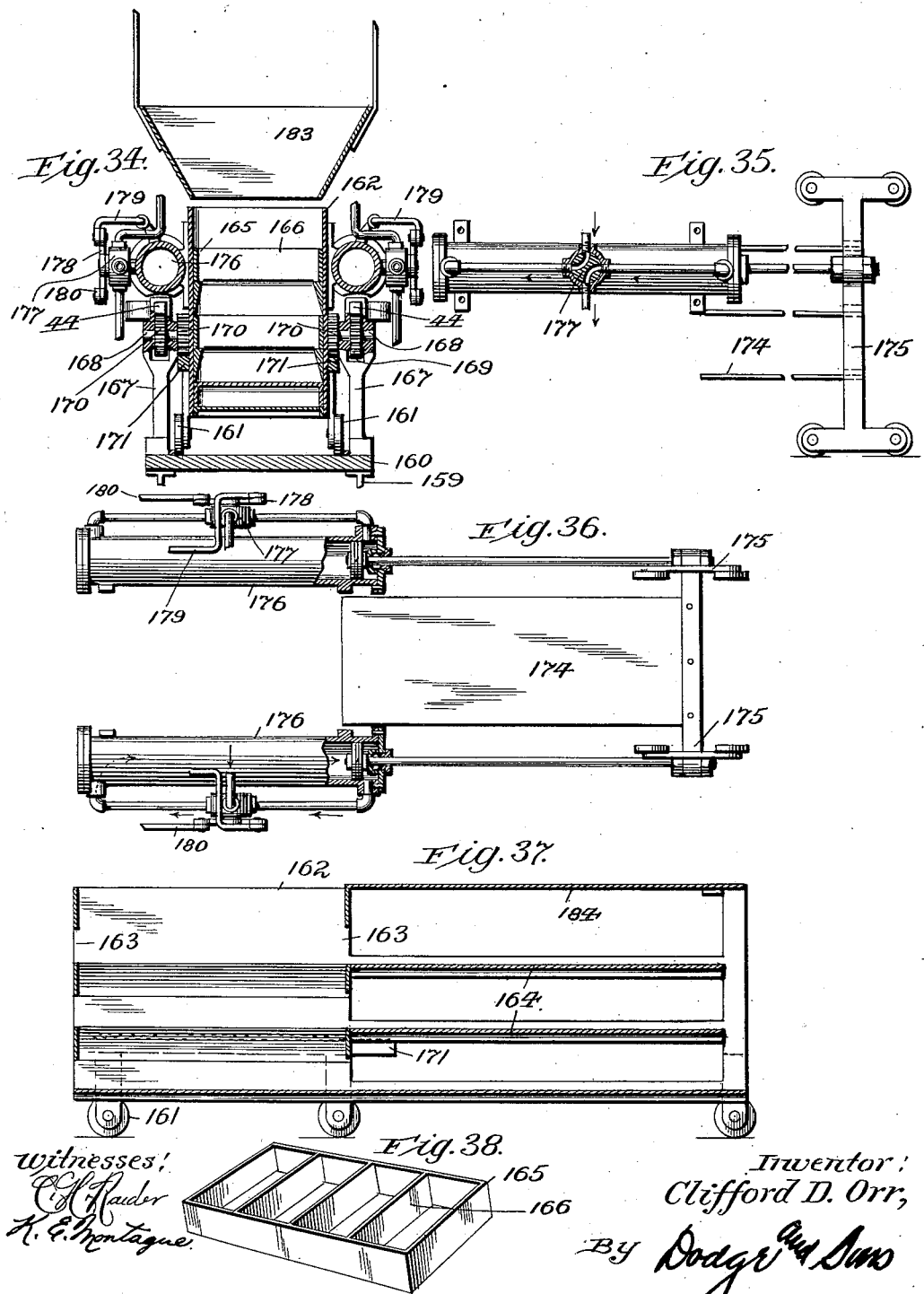

C. D. ORR.
OIL PRESS.
APPLICATION FILED FEB. 10, 1913.
1,085,993.
Patented Feb. 3, 1914.
14 SHEETS—SHEET 14.
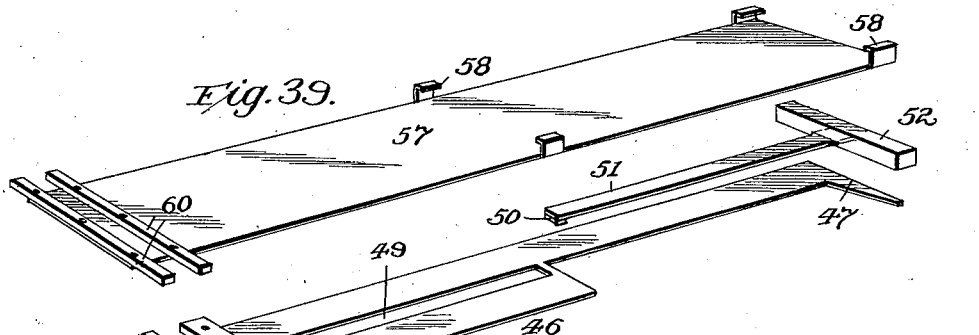
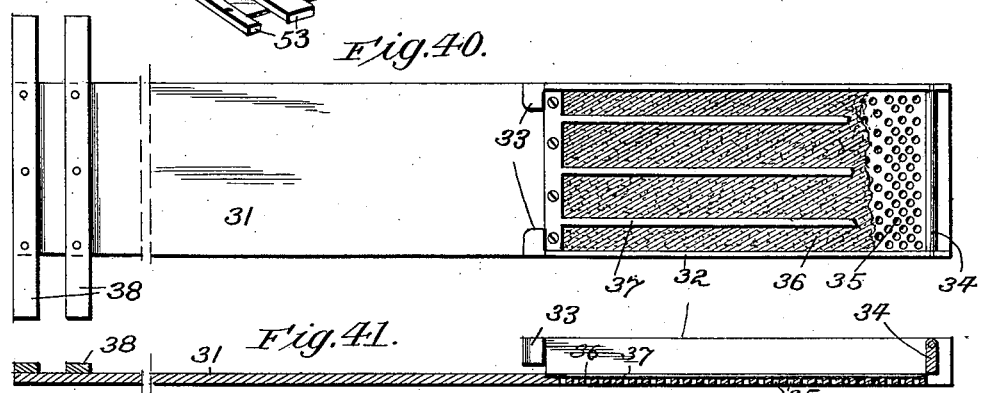
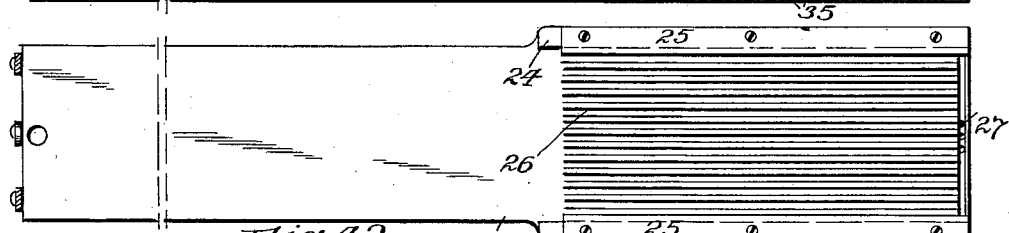
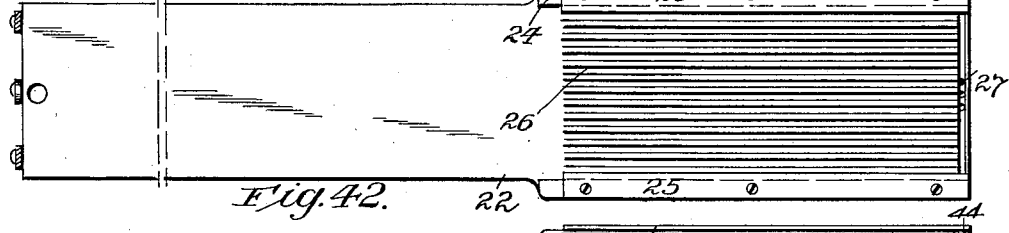
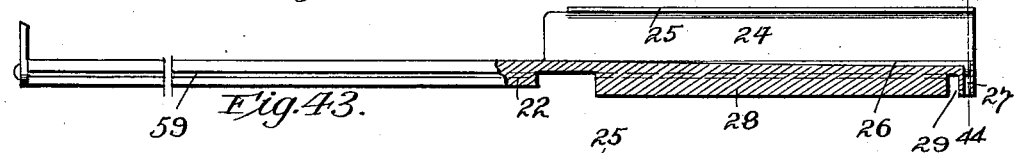
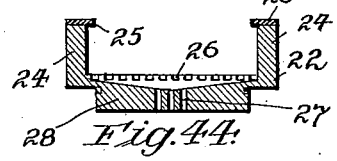
Witnesses:
Inventor:
Clifford D. Orr,
By Dodge & Sons
Attorneys.

UNITED STATES PATENT OFFICE.

CLIFFORD D. ORR, OF YAZOO CITY, MISSISSIPPI, ASSIGNOR TO ORR MANUFACTURING COMPANY, OF YAZOO CITY, MISSISSIPPI, A CORPORATION OF MISSISSIPPI.

OIL-PRESS.

1,085,993.  Specification of Letters Patent.  Patented Feb. 3, 1914.

Application filed February 10, 1913. Serial No. 747,500.

*To all whom it may concern:*

Be it known that I, CLIFFORD D. ORR, a citizen of the United States, residing at Yazoo City, in the county of Yazoo and State of Mississippi, have invented certain new and useful Improvements in Oil-Presses, of which the following is a specification.

This invention relates to an automatic press, primarily intended for the extraction of cotton seed oil from cooked cotton seed meal, certain features of the invention being adapted however, to other fields of use.

The invention provides a complete organized machine which feeds the meal to the press; subjects it to pressure for the necessary period of time, and then ejects the meal cake from the press, repeating this cycle indefinitely.

In order that the detailed description of the device may be more readily understood it should be noted that the press comprises the following main elements arranged for conjoint operation: first, a hydraulic or like press; second, a plurality of former box carriers adapted to guide a corresponding number of former boxes slidably mounted therein, and to sustain the same against distortion during the pressing action; third, the aforesaid former boxes together with suitable mechanism for moving them out of and then back into the press; fourth, a magazine or feed mechanism adapted to receive the former boxes when moved out of the press and to supply to them the necessary quantity of meal; fifth, a valve mechanism for controlling the action of the press and so arranged as to bring the press into action as soon as the former boxes have been filled and moved into the press; and sixth, a set of stripper knives and ejector plungers with suitable acutating mechanism therefor, adapted to cut the cake free of the former boxes and press heads and eject the same therefrom as soon as the pressing action has ceased.

The general method of actuating the former boxes and the stripper knives is to latch them at the proper times to a reciprocating carriage by means of a selective latching mechanism. The press controlling mechanism is normally at rest but is brought into action by a mechanism which simultaneously brings the reciprocating carriage to rest. The reciprocating carriage is set in motion at the termination of the pressing action by the descent of the press plunger. This being the general principle of the device I shall now give a detailed explanation of the embodiment of the invention illustrated in the accompanying drawings, in which:—

Figure 17:
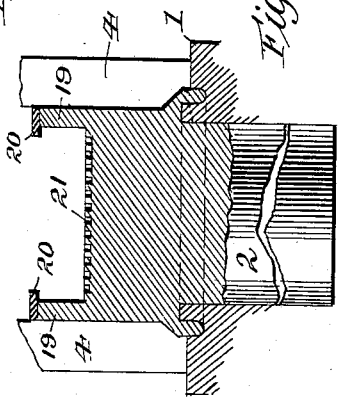
Figure 23:
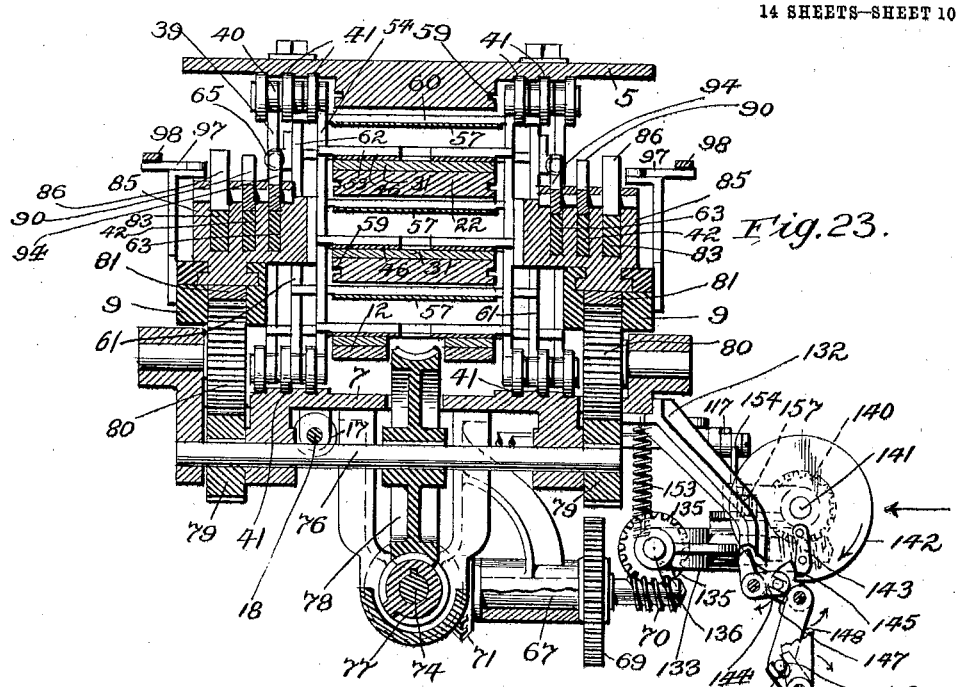
Figure 24:
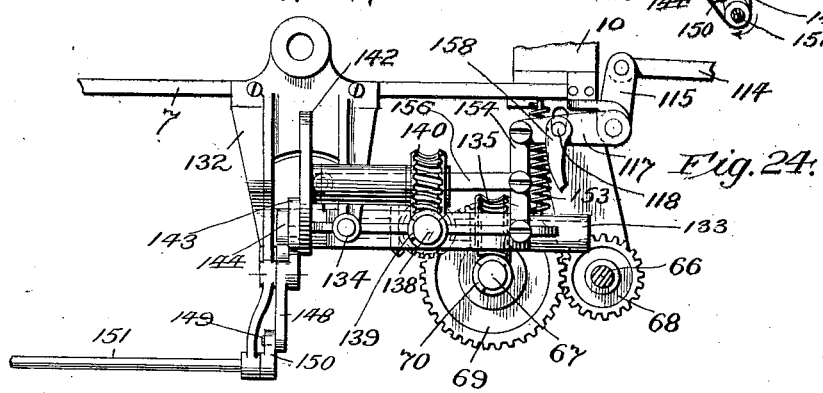
Figure 25:
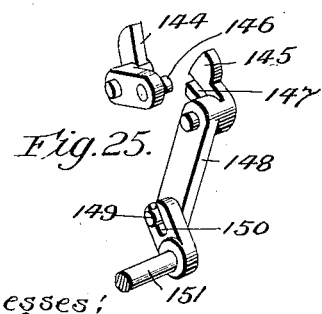
Figure 26:
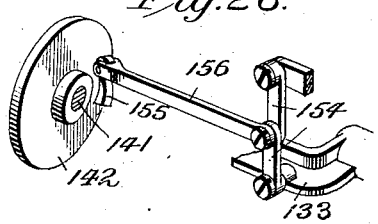

Figure 1 is a side elevation of the complete device at the moment when the carriage drive clutch has been thrown from its neutral position and the press is about to begin the first forward or stripping stroke; Fig. 2 is an enlarged fragmentary view showing the neutral stop block and the reverse mechanism and a portion of the latching mechanism in the position of Fig. 1; Fig. 3 is a longitudinal section showing the device in the position of Fig. 1; Fig. 4 is an enlarged view of the top former box and carrier together with the head block of the press, as shown in Fig. 3; Fig. 5 is a side elevation of the complete press showing the position assumed at the end of the forward ejecting stroke just at the time of reversal; Fig. 6 is an enlarged fragmentary view showing the position of the latches as in Fig. 5; Fig. 7 is an enlarged fragmentary view showing the position assumed by the latches at the end of the first return movement, the carriage being about to move forward to pick up the box carriers and move them on the forward filling stroke; Fig. 8 is a longitudinal section showing the position assumed in Fig. 5; Fig. 9 is an enlarged fragmentary view showing the top former box, carrier, etc., in the position assumed in Fig. 8; Fig. 10 is a side view of the complete press showing the filling action, the former boxes being fully projected and the cut-off plates being withdrawn; Fig. 11 is an enlarged view showing the position of the latching mechanism during the filling action; Fig. 12 is a longitudinal section in the position of Fig. 10; Fig. 13 is an enlarged fragmentary view of the press head block, top former box, etc., of Fig. 12; Fig. 14 is a longitudinal section during the pressing action with the power carriage drive in neutral position and the press about to descend at the end of the pressing action; Fig. 15 shows two fragmentary elevations of the pawl mechanism carried by the plunger to start the carriage drive at the end of the pressing action; Fig. 16 is a side elevation of the press in the position of Fig. 1 the view being taken from the opposite side of the press from that shown in Fig. 1; Fig. 17 is a section through the press plunger on the line 17—17 of Fig. 3; Fig. 18 is a detail elevation of the power drive and control mechanism for the power carriage; Fig. 19 is a section on the line 19—19 of Fig. 18; Figs. 20 and 21 are detail views of the neutral stop block for the carriage; Fig. 22 is a detail sectional view of the carriage reversing clutch; Fig. 23 is a section on the line 23—23 of Fig. 14; showing the press controlling mechanism and its relation to the carriage drive mechanism; Fig. 24 is a face view of the press controlling mechanism looking in the direction of the arrow in Fig. 23; Fig. 25 is a detail perspective view of the valve controlling finger mechanism; Fig. 26 is a detail perspective view of the timer disk and toggle throw-out mechanism; Fig. 27 is a detail sectional plan of the rear end of the device as viewed in Fig. 1, the former boxes and knives being omitted; Fig. 28 is a section plan of the device, the latch frame being omitted; Fig. 29 is a detail perspective view of one sliding rack with its connected slide block and corresponding latch block; Fig. 30 is a detail sectional plan showing the device in the position of Fig. 5; Fig. 31 is a detail view of one of the former box carriages; Fig. 32 is a detail view of one of the top knife carriages; Fig. 33 is a detail view of one of the bottom knife carriages; Fig. 34 is a section on the line 34—34 of Fig. 1; Fig. 35 is a detail side elevation of the cut-off plate cylinder and carriage with the control valve shown in section; Fig. 36 is a plan view, partly sectional, of the same; Fig. 37 is a vertical longitudinal section of the meal cabinet; Fig. 38 is a perspective view of a meal frame; Fig. 39 is a perspective view of the top knife, the ejector head and lower knife separated from each other; Figs. 40 and 41 are plan and longitudinal section of a former box; Figs. 42 and 43 are plan and longitudinal section of a former box carrier; and Fig. 44 is a section on the line 44—44 of Fig. 43.

In the drawings 1 represents the cylinder and base casting of the press, 2 the press plunger, 3 the head block and 4 the press tie rods. The head block 3 is formed with a rearwardly extending top plate 5 which is a part of the frame supporting and inclosing the charging, forming and stripping mechanism. The top plate 5 is tied by struts 6 to the bottom plate 7 which is also supported at 8 on the press tie rods 4. The guide 9 for the power carriages and latch blocks (later to be described) are each carried on the bottom plate 7 by three brackets 10, and extend along each side of the machine. At their extreme rear ends they are sustained by uprights 11.

The press plunger 2 is formed with a rearwardly extending plate 12 which lies between the top and bottom plates 5 and 7 and is guided at its rear end on the guide rod 13. A rack 14 at the rear end of plate 12 and a rack 15 on plunger head 2 are geared together by the pinions 16, bevel gears 17 and longitudinal shaft 18 so that plate 12 will maintain its normal horizontal position throughout the vertical movement of the press plunger (see Figs. 1, 3 and 19). The plunger head 2 and plate 12 serve as the lower-most former box guide being provided with the side flanges 19, retainers 20, and drain grooves 21 (see Fig. 17) identical with similar parts in the former box guides 22 now to be described.

The former box guides 22, two being shown consist of long narrow plate like structures (see Figs. 42–44), guided at their rear ends on the guide 13 and held in the normally spaced relation by the springs 23. At their forward ends, which lie between plunger 2 and head block 3 they have side flanges 24 and box retainers 25, oil grooves 26 and oil discharge openings 27. A protruding press block 28 is formed on the lower face of each carrier 22 and on the lower face of head block 3 to enter the former boxes and compress the material contained therein (see Fig. 4). The grooves 29 receive the end gates of the former boxes and the gates are thereby locked closed during the pressing action. Slotted guide links 30 guide the carriers 22 with reference to plunger head 2 and head block 3 and secure the desired spacing of the former boxes when the plunger head is down (see Figs. 1 and 10).

The former boxes, three in number, rest directly on the plunger head 2 and the former box guides 22. They are guided and sustained by the heavy flanges 19 and 24 and are held down by retainers 20 and 25. Each former box comprises a rearward extension plate 31 and a box portion proper 32 to receive the meal. The box is open partly across its rear end but has lugs 33 at each side, and is closed at its forward end by a gate 34 hinged at its upper edge and locked closed on entering groove 29, mentioned. The bottom of the box has perforations 35 covered by a straining cloth 36. The cloth 36 is protected from the lower stripping knife by a grid 37, (see Figs. 28, 40—41). Across the rear ends of extension 31 are the lugs or bars 38 which straddle the upright bars 39 of two wheeled carriages 40, (see Figs. 28 and 31). The carriages 40 are guided by the outermost pair of three sets of grooves 41, (see Fig. 23) formed in the top plate 5 and bottom plate 7. Each has the slide bar 42 passing through the corresponding one of two latch blocks (to be described) and having the latch notch 43. At the ends of slide bars 42 are racks 44 to drive the meal cabinet during the filling action. A throw-out lug 45 for the lost motion stop is carried on bar 39.

Resting directly on and guided by the plates 31 of the former boxes are the bottom knives 46 one for each box and having the forward cutting edges 47 (see Figs. 28 and 39). Back of the cutting edge each knife is cut away to permit the ejected cake to overbalance and fall off the knife. The rear end of each knife has a through slot 49 in which slides the lug 50 on tail 51 of the corresponding ejector head 52. The ejector heads extend the full width of the former boxes to close the rear ends thereof and are kept from moving rearwardly out of the boxes by the lugs 33. Thus if a bottom knife be moved forward from its extreme rear position it first cuts the bottom of the cake free, then picks up the ejector when lug 50 reaches the end of slot 49 and forces the cake from the box, the cake passing out on the knife under gate 34. At the rear end of each knife are cross bars or lugs 53 which engage the upright bars 54 of two wheeled carriages 55 which are guided by the innermost set of grooves 41 (see Figs. 23 and 33). Each carriage has a lug 56 which engages lugs on one of the two latch blocks mentioned, so that the bottom knives partake of all the movements of the latch block.

The top stripper knives 57, consist of thin plates guided by inturned lugs 58 running in grooves 59 on the edges of top plate 5 and carriers 22 (see Figs. 23 and 39). The top knives pass closely across the faces of the protruding press blocks 28 to cut the cake therefrom should it stick. Each knife 57 has the cross bars or lugs 60 which engage the upright bars 61 of two wheeled carriages 62. These carriages are guided in the intermediate set of grooves 41, and carry the slide bars 63 with latch notch 64 and also the spring plunger 65 (see Fig. 32). The slide bars 63 pass through the latch blocks already mentioned.

The mechanism for actuating the former boxes, strippers and ejectors will now be described. Power is furnished by belt or other means to shaft 66 and from there transmitted to shaft 67 by gears 68 and 69 (see Figs. 18, 19 and 23). Shaft 67 carries worm 70 by which power is furnished to the press controlling device and a bevel gear 71. The bevel gear 71 drives bevels 72 and 73 loose on shaft 74 in opposite directions and a jaw clutch 75 splined on shaft 74 is arranged to clutch either gear 72 or 73 to shaft 74, thus providing a reversible drive. Shaft 74 drives shaft 76 by worm 77 and worm wheel 78. The shaft 76 carries gears 79 which through idlers 80 drive the racks 81 sliding in guides 9. Thus by throwing clutch 75 the racks 81 may be driven simultaneously in either direction. Each rack 81 is fast to a slide block 82 sliding in guides 9 and provided with a slide bar 83. This slide bar passes through an opening 84 in a corresponding latch block 85 also sliding in guides 9 (see Fig. 29). Recalling that the latch block mechanism is constructed in duplicate, one mechanism on each side of the machine, one only need be described. The block 85 carries a pawl 86 adapted to engage notch 87 in bar 83 and adapted to be held in such engagement by spring plunger 88. The slide bar 42 of one former box carriage 39 passes through a guide 89 in block 85 and a pawl 90 on block 85 may engage notch 43 being alternatively held out of such engagement by spring plunger 91 on bar 83 and forced into such engagement by finger 92 on slide block 82. The slide bar 63 of a top knife carriage 62 passes through an opening 93 in latch block 85 and a latch pawl 94 is normally held into notch 64 by spring plunger 65. A pivoted pawl 95 wipes the pawl 94 out of engagement on the forward stripping stroke as soon as the top knives have crossed the press blocks 28, allowing them and the carriages 62 thereafter to remain at rest. (Fig. 6). The lug 56 on carriage 55 lies between lugs 96 on latch block 85, so that the bottom knives always move with the latch block 85 as already suggested.

Mounted at the sides of the press at the limits of rearward motion of the latch blocks are bell cranks 97 connected to reach rods 98 which extend nearly to the limit of forward motion of the latch blocks and there terminate in inwardly extending lugs 99. When the press is about to start the forward stripping stroke, latch 86 is in notch 87. Consequently plunger 91 holds pawl 90 out of notch 43, and plunger 65 is holding pawl 94 in notch 64 on the top knife carriage (see Fig. 2). Thus the former boxes remain at rest; the bottom knives move forward with the latch block 85 throughout its stroke, picking up the ejector during the last portion thereof; and the top knives move forward until tripped off by pawl 95. At the end of the forward stroke, latch blocks 85 strike lugs 99 swinging one arm of each bell crank 97 into the path of latches 86 (see Figs. 6 and 30). At the end of the return stroke which retracts knives and stripper, the latches 86 are held out by the arm of bell crank 97 (see Fig. 7) and on the forward stroke slide rods 83 move through latch blocks 85 until the fingers 92 strike latches 90 and force them to enter notches 43 on the former box carriages thereafter the former box carriage and the knife carriages move forward together (see Fig. 11), the rack 44 operating the filling devices in a manner to be described. During this second outward travel the lugs 45 on the former box carriages wipe the arms of bell crank 97 back, and on this stroke the latch blocks 85 do not move forward far enough to reset them. At the beginning of the second backward stroke bars 83 slide through blocks 85 until latch 86 engages notch 87. At the end of the second return stroke the carriage comes to rest ready for the pressing action, the carriage latches then being in the position of Fig. 2.

The mechanism for reversing the movement of the slide and latch blocks will now be described. At the desired limit of backward travel of block 82 is a lever 100 having a spring held plunger contact head 101 (see Fig. 2). At the desired limit of forward travel of the forward end of bar 83 is a lever 102 having a spring held plunger contact head 103 (see Figs. 6 and 11). The levers 100 and 102 are connected to move together by a reach rod 104 which in turn is connected by bell crank 105, link 106, bell crank 107 and link 108 to the shipper 109 of clutch 75 (see Figs. 18 and 19). On the shaft 110 upon which bell crank 107 is fastened is a double inclined cam 111. Bearing against the cam 111 is a spring plunger 112, the two forming a quick-throw device, so that when the block 82 or bar 83 collides with contact head 101 or 103, the contact head spring plunger is first stressed sufficiently to overcome the quick-throw device, and then suddenly moves clutch 75 to reverse the drive. Certainty of reversal is thus secured.

The mechanism for stopping the motion of the carriages at the end of the second return stroke, starting and stopping the press action, and then starting the carriages will now be described. At the rear end of the machine is pivoted a lever 113. The lower end of the lever 113 is connected by a link 114 to the vertical arm of a bell crank 115 fast on shaft 116 (see Figs. 18 and 19). The shaft 116 carries on its opposite end which is at the other side of the press, an arm 117, parallel to the horizontal arm of bell crank 115 (see Fig. 24). Mounted in bearings in arm 117 and horizontal arm of bell crank 115 is a shaft 118. Pivoted to the top of lever 113 is neutral stop block 119 upon whose hub are two ratchet teeth 120, 121 (see Fig. 20). A spring held pawl 122 is mounted on the end of one rack 81 so as to engage the teeth 120 and 121 as the rack approaches the limit of its rearward motion but to pass them upon the forward stroke. A bell crank 123 having a ratchet pawl 124 is carried by brackets 125 in such position as to be turned by a lug 126 on rack 15, during the descent of the press head 2, (see Fig. 15) but so as to be unaffected by the upward movement thereof.

The bell crank 123 is connected by a reach rod 127 to the lower arm of lever 128 fast on shaft 118, the upper end of lever 128 being connected by link 129 to one arm of bell crank 130 pivoted on link 114. The other arm of bell crank 130 is connected by link 131 to neutral stop block 119.

On the first backward movement of rack 81, the pawl 122 engages tooth 120 turning block 119 toward but not to obstructing position (see Fig. 7). On the second or final backward movement pawl 122 engages tooth 121 turning block 119 to the position shown in Fig. 18, in which position it is engaged and moved by lever 100 whose throw it then limits. The results of this action are to move lever 113 and consequently lever 117 to start the pressing action in a manner to be explained; and to arrest lever 100 in such position as to hold clutch 75 in neutral position. After the pressing action is completed the descent of plunger 2 through the action of lug 126, bell crank 123 and the connected mechanism swings block 119 back to position of Fig. 1, whereupon plunger 101 throws clutch 75 into forward drive position. The rotation of shaft 118, during this action is utilized to reset the throwout device of the press controlling mechanism while motion of lever 113 disengages the press control drive.

The press controlling mechanism is supported on a bracket 132 on the opposite side of the press from the neutral stop block mechanism (see Figs. 18, 19, 23–26). The control mechanism is carried on a suitably formed frame 133 pivoted at 134 to brackets 132 so as to have sufficient movement to bring worm wheel 135, which is carried by frame 133, into and out of mesh with worm 70 heretofore mentioned. Worm wheel 135 is fast on shaft 136 which by miter gears 137 drives shaft 138. Shaft 138 by means of worm 139 and worm wheel 140 drives shaft 141 which is the timer shaft and carries timer disk 142. The disk 142 carries on its front face a tooth 143, and this tooth will, as the disk rotates, successively engage two pivoted fingers 144 and 145, the finger 144 having a crank pin 146 running in a radial slot 147 on a portion of finger 145. The two fingers are thereby so connected that as one is wiped down by tooth 143 the other is protruded into the path of said tooth. Finger 145 has a crank extension 148 with a pin 149 engaging a slotted crank 150 on valve rod 151. This is connected to an ordinary three way press valve 152 adapted to connect the press cylinder to supply or exhaust alternately (see Fig. 16). The parts are so arranged that the wiping down of finger 144 admits pressure to the cylinder and the wiping down of finger 145 exhausts pressure therefrom. Thus while the press is out of action and the former boxes are being stripped and recharged tooth 143 is at rest in the narrow space between fingers 144 and 145, ready to wipe down finger 144.

The worm wheel 135 is normally held out of mesh with worm 70 by a spring 153, but may be brought into mesh therewith by the downward movement of lever 117 when neutral stop block 119 is held to the rear by slide block 82. The connection between lever 117 and frame 133 is made by two links 154 hinged together to form a toggle strut. The toggle strut may be broken by a cam 155 formed on disk 142 and adapted to engage a thrust rod 156 connected to the hinge of the toggle. The thrust rod 156 passes through a guide 157 in which it is given a limited vertical play. The cam 155 is so located as to break the toggle just after the tooth 143 has moved valve 152 to exhaust position. While cam 155 is acting on rod 156 it lifts it to the limit of its vertical play in guide 157 and as soon as the toggle has broken, the rod 156 falls to its lower position so that it may clear cam 155 when the toggle is reset. The resetting of the toggle is effected by finger 158 fast on shaft 118 which receives a partial rotation when the neutral stop block is thrown up.

Remembering that the carriage is started on its first outward or stripping stroke by the descent of the press plunger which rocks bell cranks 123 to throw out neutral stop block 119, it will be apparent that the toggle members will then be reset by arm 158 due to the partial rotation of shaft 118. Before this resetting takes place, however, the release of lever 113 by the upward movement of block 119, permits spring 153 to lift worm wheel 135 out of mesh with worm 70 so that the press control device is not set in motion. On the second backward motion of the carriage, block 119 will have reached its operative position (Fig. 18) thus causing locking of the carriage drive in neutral and also causing the worm wheel 135 to mesh with worm 70 through the movement of lever 113. The timer disk then begins to rotate slowly, first wiping down finger 144 to admit pressure to the press cylinder, then wiping down finger 145 to exhaust the press cylinder, and finally tripping rod 156 to break toggle 154 and unmesh worm wheel 135 from worm 70. This brings the timer disk to rest. The descent of the press throws in the carriage drive, raises lever 117 and resets the toggle as already set forth. The press control then remains inert until the carriages have completed the next stripping and filling strokes.

The mechanism for supplying meal to the former boxes will now be described. (See Figs. 34–38). A plurality of upright frames 159 carry the horizontal track or way 160. Mounted on wheels 161 guided by the track 160 so as to move toward and from the front of the press is the meal cabinet 162 through whose front and rear are the alined openings 163 whose position is such as to permit the passage of the former boxes when moved forward out of the press. Filling the space within the cabinet between these openings 163 and slidable on the guide plates 164 are the rectangular frames 165, open at their bottoms and provided with vertical transverse partitions 166. Mounted on uprights 167 at each side of track 160 are shafts 168 fast to each of which are gears 169 and 170. The racks 44 on the former box carriages mesh with gears 169 and the gears 170 mesh with racks 171 fast to the sides of the meal cabinet. Thus when the former boxes are moved forward out of the press the meal cabinet is moved toward the press the former boxes entering through the openings 163 in the cabinet and holding back the frames 165 which with their contained meal slide back onto the plates 164 (see Fig. 10). Upon the return movement of the meal cabinet the frames 165 slide back into place being held against movement by stop bars 172 carried by an upright 173. In order to prevent descent of the meal into the former boxes until the boxes are fully within the cabinet a cut off plate 174 is mounted to slide over the top of each frame 165 by which, and by the former boxes, they are supported. The cut-off plates 174 are connected to a wheeled yoke or carriage 175. A pair of double acting hydraulic cylinders 176 are mounted on the sides of the cabinet 162 and their pistons are connected to the carriage 175. Each cylinder has a combined supply and exhaust valve 177 adapted to connect either end of the cylinders to supply and the opposite end to exhaust. Each valve is actuated by a lever 178 to one end of which is connected the thrust rod 179 adapted by collision with head block 3 to admit pressure to the head end of the cylinder, and to the other end of which is connected the rod 180 passing over roller 181 with its end terminating in position to be engaged by latch block 85 at the end of the first forward or stripping stroke. In order that rod 180 may clear the block 85 during the filling action (see Fig. 10), a cam 182 is formed on the rod in such position as to engage roller 181 and lift the end of the rod when the cabinet is moved toward the press. (See Fig. 10).

The arrangement of the mechanism is such that when the former boxes are fully within the meal cabinet rods 179 collide with head block 3 thus admitting pressure to the head ends of cylinders 176 and withdrawing plates 174 from the cabinet. On the second backward stroke of the press carriages the cabinet moves back to its normal position and receives a new charge of meal, after which on the forward stripping stroke of the press carriages the reversal of valve 177 (see Fig.

5), moves cut-off plates 174 back to closing position. Meal is supplied to the cabinet by any suitable conveyer through hopper 183, the top plate 184 of cabinet 162 serving as a cut-off therefor (see Fig. 12.)

The general operation of the device and the sequence of events may be briefly summarized as follows: Cotton seed meal is supplied to the hopper 183 by any suitable means, and oil or water, preferably oil, is supplied under heavy pressure to the supply port of valve 152. Oil or water, preferably under lower pressure, is supplied by any suitable connections to the supply port of valve 177 and shaft 66 is constantly driven by any suitable motor. Under these conditions the device will automatically repeat its cycle for an indefinite period.

Assuming the pressing action to be just completed the descent of the press plunger will near the bottom of its stroke through the swinging up of neutral stop block 119 allow the carriage drive clutch 175 to move into forward driving position. Simultaneously the release of lever 113 throws out the power control device for the press and resets the toggle or secondary throw-out for the control device. During the first forward movement of the power carriages 82 the latch blocks 85 are latched to the forward ends of bars 83 so that the former box carriages 40 remain at rest. Throughout the forward movement of the power carriage and latch block each bottom knife moves across the bottom of its corresponding former box, picks up its ejector head and then moves forward out of the former box carrying with it the cake. The top knives 62 also move across the press blocks 28 during the first part of this stroke. At the forward extremity of this stroke and at the time of reversal, rods 180 are forced forwardly admitting pressure to the rod ends of cylinders 176 and forcing the cut-off plates 174 back into the meal cabinet. At this time the bell crank stops 97 are also set to obstructing position. The carriages now make their first return stroke. Through the action of the bell cranks 97 bars 83 are unlatched from latch blocks 85 at the end of the first rear stroke. The neutral stop block 119 is set down one tooth just before reversal. The latches 86 being now held out, the bars 83 slide through latch blocks 85 until arms 92 engage latches 90, thus latching the former box carriages 40 to the latch blocks 85.

The former box carriages 40 and the bottom knife carriages 54 hold the top knife carriages between them and all move forward together on the second forward stroke. This causes the former boxes to slide longitudinally out of the press, the boxes being separated desired distances by the slotted links 30. At the same time the racks 44 cause the meal cabinet to move toward the press so that the former boxes enter into the cabinet forcing back the frames 165. At the end of the forward stroke, rod 179 by collision with head block 3 admits pressure to the head end of cylinder 176 withdrawing the cut-off plates 174 and admitting meal from the cabinet to the former boxes. On the forward movement of carriage 40 lugs 45 wipe back bell cranks 97. Upon the return movement of power carriage 82, bar 83 first slides through block 85 until they latch together, after which the continued movement of the carriage 82 draws the former boxes back into the press and at the same time causes the retraction of the meal cabinet 162. Plates 174 are still withdrawn and as the plate 184 is drawing back from hopper 183 the cabinet is filled from the hopper. Just before the end of the second backward stroke, neutral stop block 119 is swung down to operative position throwing the clutch drive 175 to neutral position and moving lever 113 to start the press control drive. The movement of the press control device first admits pressure to the press cylinder then exhausts it therefrom and at once actuates the toggle throw-out to disconnect the press control drive. The descent of the press plunger which immediately follows the release of pressure causes an immediate repetition of the cycle outlined.

It is therefore to be noted that the principal elements of the device are a press, one or more press boxes or former boxes movable into and out of the press, a measuring device adapted to deliver definite quantities of meal to the former boxes, a device for stripping and ejecting pressed cakes from the former boxes, and a press control device adapted to cause the press to exert pressure upon the meal contained in the former boxes for a definite period of time. This period of time once fixed upon would not require frequent change, though it is obvious that the duration of the pressing action is determined by the design of the power trains by which the timer disk is driven.

The device is obviously subject to various modifications and I do not limit myself to the specific structure illustrated and described except as specifically stated in the claims.

Having thus described my invention, what I claim is:—

1. The combination of suitable actuating means; an expressing press having a plurality of press chambers; a charging mechanism for said press, adapted to charge all its chambers simultaneously; a stripping mechanism for the press; and suitable control mechanism for the press and the stripping and charging mechanisms adapted to render them operative in proper sequence.

2. The combination of suitable actuating mechanism; an expressing press having a plurality of press chambers; a charging mechanism for the press adapted to charge all its chambers simultaneously; a stripping mechanism for the press adapted to strip all its chambers simultaneously; and a control mechanism for the press and for the stripping and charging mechanisms adapted to bring successively each into operation while maintaining the others in an inoperative condition.

3. The combination of suitable actuating means; an expressing press having a plurality of press chambers; a charging mechanism adapted to charge all said chambers simultaneously; a stripping mechanism adapted to strip all said chambers simultaneously; and a control mechanism for the press and for the charging and stripping mechanisms adapted to cause them to repeat the following cycle of operations, first, bring the charging mechanism into action, second, admit pressure to the press for a definite period, third, release the press, fourth, bringing the stripping mechanism into action.

4. The combination of suitable actuating means; an expressing press; a control mechanism for the press; a stripping and charging mechanism for the press; a second control mechanism for the stripping and charging mechanism; operative connection between said control mechanisms whereby the movement of the second to disconnect the stripping and charging mechanism simultaneously connects press control mechanism; and a device in operative relation with both said control mechanisms and adapted to disconnect the press control mechanism and connect the stripping and charging mechanism.

5. The combination of suitable actuating means; an expressing press; a control mechanism for the press; a stripping and charging mechanism for the press; a second control mechanism for the stripping and charging mechanism; operative connection between said control mechanisms whereby the movement of the second to disconnect the stripping and charging mechanism simultaneously connects the press control mechanism; and a device in operative relation with both said control mechanisms, adapted to be actuated by the relieving movement of the press to disconnect the press control mechanism and connect the stripping and charging mechanism.

6. The combination of an expressing press; suitable supporting means mounted in the press; a press box carried by said supporting means; means for ejecting pressed cakes from said press box; means for moving said press box out of and into the press; a device operative in the outward position of the press box to supply material thereto; and an automatic control mechanism for the press box, ejector mechanism and the press and adapted to operate them in proper sequence.

7. The combination of an expressing press; suitable supporting means mounted in said press; a press box mounted in said supporting means; mechanism for moving said press box out of and back into the press; means for stripping pressed cakes from said box; supply mechanism operative in the outward position of the press box to supply material thereto; and a control mechanism for actuating the press box, strippers, ejector, supplying mechanism and press in proper sequence.

8. The combination of a press; suitable supporting means mounted in said press; a press box guided in said supporting means, and movable into and out of said press; supply mechanism actuated by the outward movement of said box to supply material to said box when in its outward position; suitable stripping and ejecting mechanism for the box; and suitable actuating and controlling mechanism for the press, box, strippers and ejectors adapted to bring them into action in proper sequence.

9. The combination with a press having a press box adapted to be moved out of and into said press; of a movable supply magazine; operative connections to cause said magazine to move toward and over said box as the same is moved out from the press; and a cut-off device for the supply mechanism adapted to be opened near the limit of movement of the box from the press to admit material from the supply magazine to the box.

10. The combination of a press; a press box adapted to move out of and into said press; a supply magazine having an aperture to receive the press box; a sliding frame adapted to fill said aperture and to be held back by said press box; means for moving said box out of and then back into the press and simultaneously moving the magazine toward and then from the press; a cut-off slide adapted to control the flow of material from the magazine to the box; and a power actuated device connected to said slide and operative near the limit of outward movement of the box to withdraw said slide and after the inward movement to return it.

11. A press controlling device for a press having a charging mechanism, comprising in combination a press controlling element; a drive train therefor adapted to be moved into and out of driving relation; mechanism actuated by the press charging device at the termination of the charging action for moving said drive train into operative relation; a secondary throw-out device operated by the press control member at the completion of its press controlling movement to disconnect the press control drive train; and a resetting mechanism actuated by the releasing movement of the press and adapted to disconnect said drive train and simultaneously reset said secondary throw-out.

12. The combination of a hydraulic press; a charging mechanism therefor; a power driven shaft; a rotatable timer; a movable support for the timer adapted to carry the same into and out of driving relation with said shaft; a valve actuated by the rotation of said timer to admit and release pressure fluid to and from said press; a member in operative relation with the charging mechanism and adapted to be moved in opposite directions at the beginning and end of the charging action; a mechanical connection between said member and said movable support; a throw-out device interposed in said mechanical connection and adapted to be actuated by the timer upon the completion of its action; and automatic means for resetting said throw-out device.

13. The combination with a press including a plunger and an opposed head block; a plurality of box carriers supported in said press between the plunger and head block; press boxes guided in said box carriers and on said plunger and movable longitudinally out of and back into the press; guide carriages for said boxes; a set of bottom knives one for each box; ejectors actuated by the bottom knives; guide carriages for the bottom knives; a set of top knives one for each box; guide carriages for the top knives; a power carriage adapted to reciprocate in the general line of movement of said guide carriages; and automatic means for selectively latching the various guide carriages to said power carriage.

14. The combination of an expressing press having a head block and a plunger; a plurality of box guides mounted in the press between the plunger and head block; each guide being formed with a protruding press block adapted to enter the box in the next adjacent guide; press boxes slidably mounted in the guides; and means for moving the boxes out of and into the press.

15. The combination of an expressing press having a head block and a plunger; a plurality of box guides mounted in the press between the plunger and head block; each guide being formed with a protruding press block adapted to enter the box in the next adjacent guide; press boxes slidably mounted in the guides; stripper knives adapted to pass across the bottoms of the boxes and over the press blocks; ejectors adapted to be engaged and moved by one set of knives; and means adapted to actuate the knives and to move the boxes out of and into the press.

16. The combination of an expressing press having a head block and a plunger; a plurality of box guides mounted in the press between the plunger and head block; each guide being formed with a protruding press block adapted to enter the box in the next adjacent guide; press boxes slidably mounted in the guides; stripper knives adapted to pass across the boxes and press blocks; an ejector adapted to be engaged and moved by one set of knives; means adapted to actuate the knives and to move the boxes out of and into the press; and a magazine adapted to supply material to the boxes when moved out of the press.

17. A former box mechanism for self-charging expressing presses, comprising a former box guide adapted to be supported in the press and provided with oil grooves and guide flanges; a former box slidably mounted in the guide flanges, said box having a perforate bottom; a suitable oil straining medium mounted on and sustained by said bottom; and a guard for said straining medium.

18. A former box mechanism for self-charging expressing presses comprising a guide member adapted to be mounted in the press and provided with guide flanges and oil grooves; a former box mounted to be guided by said flanges and having a perforate bottom; an oil straining medium supported on said perforate bottom; a guard for said oil straining medium; a pivoted gate at one end of said box; an ejector head adapted to close the other end of said box; and a stripping knife adapted to move across the bottom of said box above said guard and to engage and actuate said ejector head.

19. The combination of a slidable carriage; a power drive for said carriage; means for reversing the direction of said drive; a pair of levers mounted at the extremities of movement of the carriage; resilient contact heads carried by the levers and adapted to be engaged by the carriage at the extremities of such motion; connections between said levers and the reversing means; and a quick-throw mechanism associated with the reversing means to insure a sudden actuation thereof.

20. The combination of a slidable carriage; a power drive for said carriage; means for reversing the direction of said drive; a pair of levers mounted at the extremities of movement of the carriage; resilient contact heads carried by the levers and adapted to be engaged by the carriage at the extremities of such motion; and connections between said levers and the reversing means.

21. The combination of a slidable carriage; a power drive for said carriage; a reversing mechanism interposed in said power drive; a pair of levers pivoted near the opposite limits of motion of said carriage and adapted to be engaged thereby; connections between said levers and the reversing mechanism; a stop adapted to arrest said reversing mechanism in its neutral or disengaged position to bring the carriage to rest; and a ratchet mechanism operatively related to the stop and to the reciprocating carriage and adapted to set said stop in obstructing position after a definite number of movements of the carriage.

22. The combination of a reciprocating carriage; a power drive therefor; a reversing mechanism interposed in said power drive; a pair of levers pivoted near the limits of movement of said carriage; resilient contact heads mounted on said levers and adapted to be engaged by said carriage at such limits of movement; operative connections between said levers and the reversing mechanism; a neutral stop adapted to arrest said reversing mechanism in its neutral or disengaged position whereby the carriage will be brought to rest; a ratchet mechanism in operative relation with the carriage and said neutral stop and adapted to set the stop in obstructing postion by the movement of the carriage a definite number of times; and a lever mechanism for throwing said stop to its non-obstructing position.

23. The combination of an expressing press having a plunger; a press controlling mechanism; a press stripping and charging mechanism; suitable control mechanism for the stripping and charging mechanism; and a ratchet mechanism actuated by the press plunger in its releasing movement and in operative relation with both said control devices, and adapted to disconnect the press control mechanism and to throw the charging and stripping mechanism into action.

24. The combination of a rotatable timer member having a tooth; a pair of pivoted fingers connected together so as to move alternatively into the path of said tooth; a press control valve; and operative connections between said valve and said fingers whereby the movement of one finger by said tooth moves the valve to admission position while the movement of the other finger by the tooth moves the valve to exhaust position.

In testimony whereof I have signed my name to this specification in the presence of two subscribing witnesses.

CLIFFORD D. ORR.

Witnesses:
HOWARD M. BENTON,
ANNA WILSON.

Copies of this patent may be obtained for five cents each, by addressing the "Commissioner of Patents, Washington, D. C."